Figure 1:
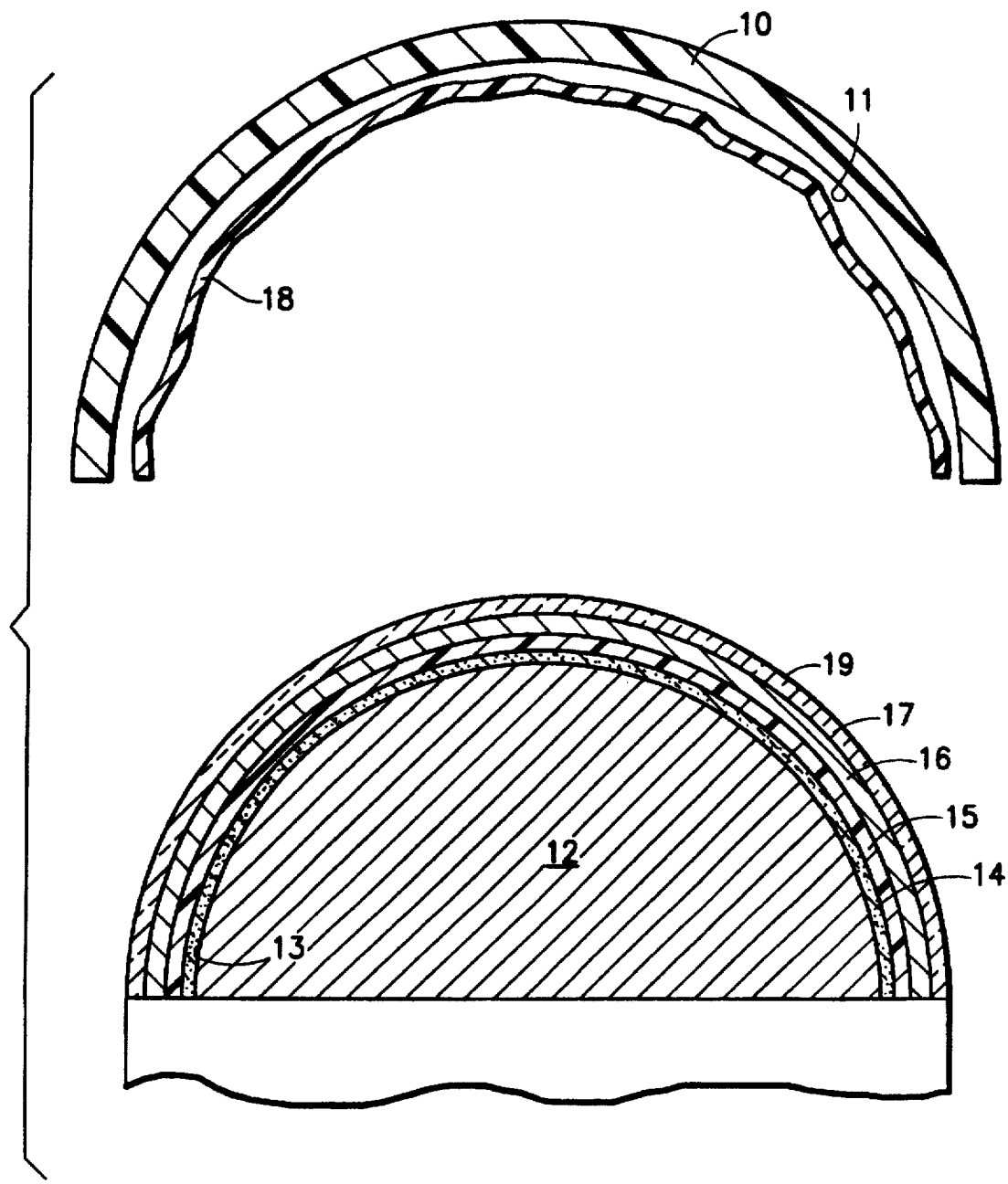

United States Patent [19]

Taylor

[11] Patent Number: 5,702,649

[45] Date of Patent: Dec. 30, 1997

[54] PROCESS AND APPARATUS FOR PRODUCING CONTOURED MOLDED MIRRORS WITH IMPROVED OPTICAL PROPERTIES

[75] Inventor: Christopher D. Taylor, Redondo Beach, Calif.

[73] Assignee: Hughes Aircraft Company, Los Angeles, Calif.

[21] Appl. No.: 402,293

[22] Filed: Mar. 10, 1995

[51] Int. Cl.$^6$ ............................................. B29D 11/00
[52] U.S. Cl. ..................... 264/1.9; 425/90; 425/110; 425/808; 264/40.1
[58] Field of Search .................... 264/1.7, 1.9, 338, 264/130, 131, 40.1; 425/808, 90, 110, 403, 406

[56] References Cited

U.S. PATENT DOCUMENTS

| | | | |
|---|---|---|---|
| 3,839,129 | 10/1974 | Neumann | 264/1.9 |
| 4,188,358 | 2/1980 | Withoos et al. | 264/1.9 |
| 4,255,364 | 3/1981 | Talbert | 264/1.9 |
| 4,339,400 | 7/1982 | Sorko-Ram | 264/2.7 |
| 4,750,827 | 6/1988 | Assus et al. | 264/1.9 |
| 5,043,106 | 8/1991 | Drummond | 264/1.9 |

*Primary Examiner*—Mathieu D. Vargot
*Attorney, Agent, or Firm*—Gordon R. Lindeen, III; Michael W. Sales; Wanda K. Denson-Low

[57] ABSTRACT

Production of precision reflective mirror surfaces on low cost, lightweight molded plastic substrates (10). The process involves making a master pattern (12) having a precision machined contoured surface (13) corresponding to the precision mirror surface desired on the plastic substrate. A release layer (14) and a reflective layer (17) are applied to the master pattern and then transferred to the molded plastic substrate (10), with a curable replication layer (18) therebetween preferably comprising a filler-reinforced polymer composition which is compatible with the polymeric substrate and has a low coefficient of thermal expansion (CTE) which closely matches the CTE of the substrate. The replication layer (20) is cured to replicate the precision of the surface (13) of the master pattern (12), which can be reused to produce a multiplicity of high precision molded plastic mirrors (21). In order to achieve improved accuracy and lower cost, the molded substrate tooling is adjusted (corrected) to account for differences in dimensions and/or surface contour. This more accurate substrate allows for a thinner replication layer which is less sensitive to error during curing and when the part is subjected to environmental conditions such as temperature variation. In the preferred case superior accuracy is achieved by the combined replication and correction process.

17 Claims, 2 Drawing Sheets

PROCESS AND APPARATUS FOR PRODUCING CONTOURED MOLDED MIRRORS WITH IMPROVED OPTICAL PROPERTIES

BACKGROUND OF THE INVENTION

The present invention relates to the production of optical contoured mirrors having low-cost molded plastic substrates. More particularly, the present invention relates to an improved economical process for producing high-precision molded plastic mirrors having excellent optical qualities and improved mechanical and thermal stability.

It is known to produce optical mirrors from molded plastic substrates in order to reduce the cost involved with the production of contoured mirrors having glass or aluminum or other expensive substrates, and surfaces produced by optical polishing, precision machining or other expensive processes normally required to produce a contoured surface of the precision desired. Thus, an injection molded plastic substrate with or without filler materials having the desired strength and thermal expansion properties, such as of acrylic, polycarbonate, styrene or other suitable polymer, is molded to the desired surface contour in a corresponding master mold, and thereafter coated with a base reflective layer, such as by vacuum deposition means. Reference is made to commonly-assigned copending application U.S. Ser. No. 08/099,280 filed Jul. 29, 1993, the disclosure of which is hereby incorporated by reference.

Among the problems involved with such fabrication processes are (1) the difficulty of molding a plastic substrate having the necessary precision-contoured surface; (2) the necessity that the molded plastic substrate have thermal stability so as to retain the original contoured surface over the conventional temperature range of usage by resisting shrinkage, expansion and/or warpage during heating, cooling and/or curing. Plastic mirrors have a structural stiffness problem resulting from the requirements of optical surface quality, mirror thickness, and required precision. The need for good optical surface quality smoothness restricts the plastic materials and filler which can be used. Typically, these materials have very low flexural stiffness when unfilled which makes fabrication and mounting very difficult and reduces the precision possible when such mirrors are installed into an optical device. The requirement for precision, as well as economical reasons, require that the mirrors be relatively thin, compared to what would be desired from a stiffness perspective. This contributes to the previously mentioned problems of stiffness.

SUMMARY OF THE INVENTION

The novel process and apparatus of the present invention involves the steps of (a) molding a substrate of the desired plastic molding composition to have a surface of the desired approximate contoured shape; (b) forming a master pattern, form or mold surface having the precise surface shape or contour required for the reflective surface to be formed on the substrate, and having release or non-stick properties; (c) applying optional protective and/or enhancement layers and an outer reflective layer over the precision release surface of the master pattern; (d) placing the coated surface of the master pattern adjacent to the contoured surface of the substrate, with a curable layer of fluid replication polymer composition interposed therebetween; (e) applying pressure while curing the replication polymer, and (f) separating the substrate and the master pattern to release and transfer the coatings from the master pattern to the substrate, bonded thereto by the cured replication polymer. The precision surface shape and contour of the master pattern is imparted to each of the coatings transferred to the substrate, most importantly to the reflective layer. Any imperfections or surface distortions or variations present in the approximately-contoured shape of the surface of the molded plastic substrate are compensated by the fluid replication polymer which flows under the applied compression to fill the space between the substrate and the reflective outer layer present on the master pattern, prior to being cured and solidified. Thus, the precision surface of the master pattern is exactly replicated on the transfer-coated molded plastic substrate to form a mirror having precision optical properties heretofore unavailable with mirrors of such type.

According to a preferred replication process, the curable layer of replication polymer composition is one which is compatible with the molded plastic substrate and which cures to form a replication layer which is flexible rather than stiff and which has a coefficient of thermal expansion (CTE) which is closely matched to that of the substrate. Most preferred replication compositions contain curable epoxy resins, which can be formulated to have a low CTE by incorporation of fillers, particularly glass bead filler which provides a smooth finish as well as a low CTE.

While the formation of the master pattern requires precision machining equipment and techniques of the type required for the formation of precision-contoured glass mirrors, the expense thereof is mitigated by the fact that the master pattern is reused to produce a multiplicity of molded plastic mirrors in the present process. Additionally, an embodiment of this invention includes the manufacture of the substrate with a predetermined correction built in to compensate for errors inherent in the molding process. This is done after the nominal substrate shape is first manufactured and used to mold mirrors which are then measured to determine the corrections required.

This compensation is desirable, and necessary in some cases, because the corrective effects and stability realized in the replication process described above are reduced in cases where the initial substrate has large dimensional errors. Dimensional errors of less than 0.0005 inch generally are acceptable, and errors up to several 1/1000's of an inch can be tolerated in some instances. It is not uncommon for errors to be 0.001 inch or larger for the molded parts. Even though mirrors of a desired shape can be made by the replication process, per se, using substrates with large errors, the choice of materials, thickness precision and end cost are reduced, and the accuracy is improved, by using the substrate compensation process in combination with the replication process.

In many instances, the replication process can be used alone, with no mold compensation, to provide the lowest cost, acceptable precision mirrors. In some cases the mold correction process may be used by itself without the need for the replication step. However, preferably the mold correction process is used with the replication process to provide the lowest cost, highest precision mirrors where acceptable mirrors cannot be produced by the replication or mold correction process alone.

THE DRAWINGS

Figure 2:
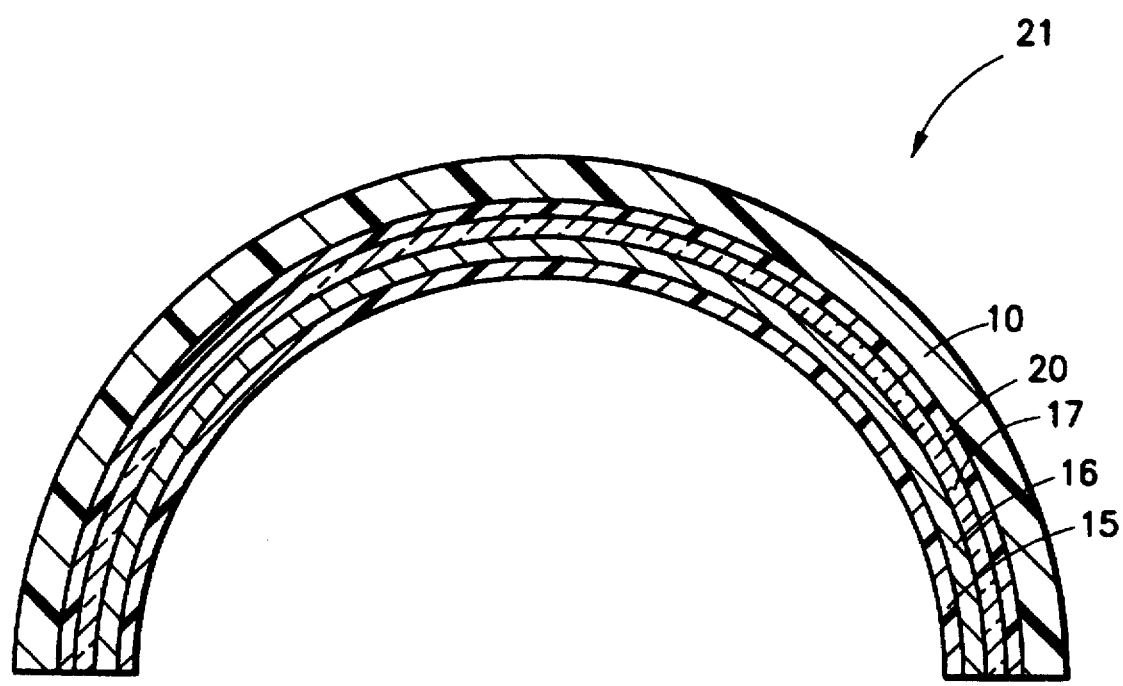

FIG. 1 is a cross-sectional view of coated master pattern, a molded plastic substrate and an interposed curable liquid replication polymer, spaced for purposes of illustration, preparatory to being brought together for compression and curing; and FIG. 2 is a cross-sectional view of a precision optical mirror having a molded plastic substrate, produced according to FIG. 1.

DESCRIPTION OF THE INVENTION

Referring to FIG. 1, the molded plastic substrate 10 thereof has a contoured molded surface 11 which is molded to approximate as closely as practical the exact shape and contour, or a compensation shape and contour, to produce the desired mirror. It is well known to mold plastic lenses and mirror substrates and those skilled in the art are aware of the properties desirable in the plastic or resinous molding compositions used, such as surface finish, resistance to thermal expansion and contraction over the temperature range of use, resistance to shrinkage and warpage or deformation on setting or aging, and other such properties. Preferred are reinforced (filled) molding polymers including epoxy resins, acrylic polymers, polystyrene, polycarbonates, polyetherimides, polyphenylene sulfides, and other similar polymer compositions having low coefficients of thermal expansion (CTE). The latter filler-containing plastic compositions are disclosed in greater detail in copending application U.S. Ser. No. 08/099,280 filed Jul. 29, 1993.

The molded surface 11 of the substrate should approximate or be compensated to produce the desired final shape, contour and smoothness of the mirror surface being produced. The closeness of the approximation will generally be a compromise between the cost of the molding process and the required degree of precision in the final mirror. Mold correction procedures provide for modifying the shape and dimensions of the mold (or mirror insert) to compensate for inherent changes which occur in the molded substrate, such as due to shrinkage as the molded substrate cures or sets. The correction procedure involves measurement of a number of molded mirrors, such as 10, and determining the average shapes. The nominal shaped inserts are also measured and any errors found therein are taken into account. Care must be taken in keeping all steps clear, for example, the inset which forms the mirror surface is the negative of the part and the error found in the molded part must also be inversed, as a correction. Thus, the correction is in the same direction as the measured error. A similar procedure applies to the original insert. The correction factor can be further adjusted to account for known shrinkage of the material. Once the correcting shape has been computed, the mold insert is polished. This is generally, but not necessarily a shape with no rotational symmetry and is done in a manner consistent with that constraint. Once the polishing is completed to the accuracy desired, the inserts are returned to the mold and the parts are molded. It is possible that due to slight errors in the measurement, computation and polishing, one or more further iterations of the correction process may be required.

The precision-imparting surface-forming element of the present process, as illustrated by FIG. 1, is the master pattern 12 which is machined or otherwise precision-formed to have a forming surface 13 corresponding as precisely as possible to the contoured surface desired to be imparted to the mirror being formed. In the embodiment illustrated in FIG. 1, the mirror being formed has a concave surface and therefore the reciprocal or complimentary forming surface 13 of the master pattern 12 is convex. However, obviously the surface 13 will be concave in cases where the substrate 10 and mirror being formed are convex. The surfaces can be of any shape, e.g., flat, spherical, aspheric, rotationally-symmetric or not.

The substrate master pattern 12 can be formed from metal, glass or other ceramic, or from injection molded filler-contained plastic compositions which are hard and resistant to dimensional changes over the temperature range of use. In each case, the forming surface 13 is dimensioned and contoured by means of precision polishing or machining devices and systems, single point such as diamond machining using computer-controlled operations or conventional optical polishing techniques to form the surface 13 having the necessary degree of precision.

Since the master pattern 12 functions as a mold component in the present process, the surface thereof is initially coated with a permanent or resistent non-stick surface layer such as of hard carbon or polymer, and/or is coated with a thin release layer 14 of a mold release agent before each application of an optional optical protective layer 15, such as a hard, scratch-resistant polymer layer of the type conventionally-applied to plastic lenses, or other materials suitable for the substrate and applications, and/or of an optional enhancement layer 16 of the type conventionally-applied to reflective layers to enhance the reflective properties thereof. The release layer may be replaced or augmented by a suitable non-stick coating on the master mirror.

The final layer illustrated by FIG. 1 is the base reflective layer 17 which preferably is deposited by chemical vapor deposition means in conventional manner. For example, a small piece of the desired metal, such as aluminum, gold, or chromium is placed on a heating coil in a vacuum chamber containing the coated master pattern 12. The metal(s) vaporize and deposit over the coated master pattern as a thin reflective layer 17. Coatings may be applied in any of a number of other coating processes currently being used for this purpose.

Surface 19 has the same precision and smoothness as the surface 13 of the master pattern 12, and the essence of the replication portion of the present invention is to retain such precision, smoothness and related properties while transferring the reflective surface 19, and the layers to which it is bonded, from the master pattern 12 to the molded plastic mirror substrate 10, the surface 11 of which does not have the precision curvature and/or smoothness of the machined surface 13 of the master pattern 12.

According to the present invention, a curable, flowable, thin layer of a replication medium 18 is positioned between the surface 11 of the substrate 10 and the surface 19 of the reflective layer 17, and pressure is applied to force the convex surface 19 against the concave surface 11 of support 10 with the thin flowable replication medium layer 18 positioned therebetween. The substrate 10 may be supported against deformation during the pressure operation or lamination step, or may be merely held in place. The flowable replication material is compressed between surfaces 11 and 19 and exudes to fill the space therebetween, with any excess escaping, so as to form the thinnest possible replication layer 20 upon curing as illustrated by FIG. 2. In effect, the cured replication layer 20 compensates for any irregularities, roughness or curvature deviations of the molded plastic substrate surface 11, whereby the precision of the machined surface 13 of the master pattern 12 is replicated on the molded plastic substrate 10, and can be replicated on a plurality of such molded plastic substrates by repeating the steps of the present invention.

As illustrated by FIG. 2, the final mirror 21 is formed by curing the compressed replication layer as layer 20 and separating the master pattern 12 of FIG. 1 from the molded plastic substrate 10. The replication layer 20 fills any surface irregularities and curvature deviations in the surface 11 of the substrate 10 and bonds to the outer surface 19 of the low emissivity reflection layer 17 during curing. The replication material preferably comprises an ultraviolet radiation-curable epoxy resin composition and low temperature curing thereof is produced by application of UV radiation. Alternatively, the curing may be carried out with the aid of heat or else by the passage of a suitable period of time.

After curing, the master pattern 12 is separated from the molded plastic substrate to cause the layers 15, 16 and 17 to be released from the release layer 14 of the master pattern 12 to form the final mirror 21 illustrated by FIG. 2.

The curable replication materials suitable for use according to the present invention are selected to be compatible with the molded plastic substrate materials with which they are used, and reference is made to the disclosure of copending application U.S. Ser. No. 08/099,280 filed Jul. 29, 1993 with respect to suitable filler-containing plastic molding compositions with are also suitable for use as the present replication materials. Preferably the cured replication material used matches the coefficient of thermal expansion (CTE) of the substrate material. The substrate should have greater stiffness than the replication layer. Also, the surface smoothness of the cured replication layer is important. Therefore, any fillers used to reduce the TCE of the curable replication material must provide the desired smooth surface finish having good optical properties, such as glass beads or microballoons, to provide an RMS surface roughness value of below one micro inch. Generally, the CTE range for filled replication polymer layers is 0.5 to $20 \times 10^{-5}$ in/in. F°.

Preferred replication polymers are thermosetting polymers since they do not require high temperature curing, which could distort or expand the substrate, which generally is molded from a thermoplastic resinous molding composition for purposes of economy and molding accuracy. Suitable replication polymers are thermosetting polymers which are curable at room temperatures or low temperatures, or are UV curable. Preferred such polymers are the reinforced (filled) epoxy resin compositions having a low CTE similar to that of the molded support 10.

Since molded plastic mirror substrates can have large errors in dimensions and/or shape, due to shrinkage of the plastic as it cools and solidifies, it is preferred to use conventional mold correction techniques to produce the substrates 10 used according to the present invention, as discussed hereinbefore. Thus, the specific dimensional errors resulting from shrinkage and/or other causes can be measured to determine a correction factor, and the mold tooling can be modified to account for or compensate for errors induced during the molding process, whereby the molded mirror substrate will shrink and/or otherwise change to the dimensions and/or shape desired for the mirror substrate 10, to produce a very accurate mirror.

The major thermal property for the present filled plastic materials used to mold the substrate 10 and to form the replication layer 20 is the coefficient of thermal expansion. A low coefficient of expansion results in an optical assembly that is better able to maintain its performance over temperature. Based on the desire to achieve low thermal expansion, the desired coefficient of expansion for the plastic material is in the range 0.4 to $1.5 \times 10^5$ in/in °F. which compares favorably to a value $1.3 \times 10^5$ in/in °F. for aluminum, or coefficients of expansion up to $5 \times 10^{-5}$ in/in °F. may be acceptable for some applications particularly where very smooth surfaces are required, making the use of filler materials not possible.

Thermal conductivity also plays an important role in the thermal stability of the material. The larger the coefficient of thermal conductivity the more uniform the temperature of the part will be, and therefore, the more uniform the thermal growth. In theory, uniform growth of the structure due to temperature changes does not cause a reduction in optical performance (with the exception of a corresponding change in the focal length and an inverse change to the field of view). In order to achieve uniform growth due to thermal effects, the substrate 10 and the replication layer 20 consist of the same reinforced (filled) plastic compositions so as to have substantially identical or matched coefficients of the thermal expansion. For all components of the optical system to have matching CTE's. Attention to thermal conductivity is an important issue because plastics are very poor at conducting heat. Generally, plastic materials have coefficients of thermal conductivity between 15 and 100 times lower than aluminum. The need for low coefficient of expansion is made all the more important by the low thermal conductivity of the plastic materials.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Process for producing a mirror having a molded plastic substrate having a contoured surface supporting a reflective layer having highly precise optical reflectance properties, comprising the steps of:
    (a) molding a plastic substrate having a contoured surface approximating the desired contour of a reflective layer to be applied thereto;
    (b) providing a master pattern having a contoured surface which is machined or otherwise worked to form a precision surface for supporting a reflective layer having highly precise reflectance properties, the contoured surface of the master pattern being complimentary to the contoured surface of the molded plastic substrate, and being a release or non-stick surface;
    (c) applying one or more other layers over the contoured release surface of the master pattern, including a reflective layer;
    (d) positioning and compressing a curable, flowable replication material between the coated contoured surface of the master pattern and the complimentary contoured surface of the molded plastic substrate to fill the space therebetween;
    (e) curing said replication material, and
    (f) separating the master pattern and the molded plastic substrate to release the coating(s) from the release surface of the master pattern to the cured replication material to form a mirror having on the contoured surface of the molded plastic substrate the reflective layer having highly precise reflectance properties.

2. Process according to claim 1 in which said molded plastic substrate comprises a filler-reinforced polymer composition having a low coefficient of thermal expansion.

3. Process according to claim 1 in which said non-sick surface is obtained by applying a permanent non-stick coating to the contoured surface of the master pattern.

4. Process according to claim 1 in which said release surface is obtained by applying a release coating to the contoured surface of the master pattern prior to each application of other layers thereover.

5. Process according to claim 1 in which the layers applied over the release surface on the master pattern include a scratch-resistance protective layer.

6. Process according to claim 1 in which the curable replication material comprises a filler-reinforced polymer composition which is compatible with the molded plastic substrate and which has a low coefficient of thermal expansion which closely matches that of the substrate.

7. Process according to claim 6 in which the polymer composition comprises an epoxy polymer.

8. Process according to claim 6 in which the filler comprises glass beads.

9. Process according to claim 1 in which the master pattern of step (b) is reused a plurality of times with a succession of molded plastic substrates to form a plurality of similar mirrors.

10. Process according to claim 1 which further comprises measuring any differences in dimensions and/or contour between the desired substrate shape and the molded plastic substrate, and making suitable changes in the dimensions and/or contour of the plastic substrate mold tooling to compensate for any such differences.

11. Process according to claim 10 in which the changes made take into consideration the dimensions of inserts.

12. Process according to claim 10 in which the changes made take into consideration the shrinkage of the molded plastic substrate.

13. Apparatus for producing a mirror having a molded plastic substrate having a contoured surface supporting a reflective layer having highly precise optical reflectance properties, comprising:

(a) means for molding a plastic substrate having a contoured surface to approximate the desired contour of a reflective layer to be applied thereto;

(b) master pattern means having a contoured surface which is machined or otherwise worked to form a precision surface for supporting a reflective layer having highly precise reflectance properties, the contoured surface of the master pattern being complimentary to the contoured surface of the molded plastic substrate, and having a release or non-stick surface;

(c) means for applying one or more other layers over the release surface, including a reflective layer;

d) means for positioning and compressing a curable, flowable replication material between the coated contoured release surface of the master pattern and the complimentary contoured surface of the molded plastic substrate to fill the space therebetween;

(e) means for curing said replication material, and (f) means for separating the master pattern and the molded plastic substrate to release the coating(s) from the master pattern to the cured replication material to form a mirror having on the contoured surface of the molded plastic substrate the reflective layer having highly precise reflectance properties.

14. Apparatus according to claim 13 which further includes means for producing said non-stick surface comprising coating means for applying a permanent resident non-stick coating on the contoured surface of said master pattern.

15. Apparatus according to claim 13 which further includes means for producing said release surface comprising application means for applying a release layer to the contoured surface of said master pattern prior to each application of another layer thereover.

16. Process according to claim 3, wherein the permanent non-stick coating is selected from the group consisting of hard carbon and a polymer.

17. Apparatus according to claim 14, wherein the permanent non-stick coating is selected from the group consisting of hard carbon and a polymer.

* * * * *